United States Patent
Tang

(10) Patent No.: US 11,206,709 B2
(45) Date of Patent: Dec. 21, 2021

(54) METHOD FOR INTERCEPTING PDCCH AND TERMINAL DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 117 days.

(21) Appl. No.: 16/718,007

(22) Filed: Dec. 17, 2019

(65) Prior Publication Data

US 2020/0128607 A1 Apr. 23, 2020

Related U.S. Application Data

(63) Continuation of application No. PCT/CN2017/111686, filed on Nov. 17, 2017.

(51) Int. Cl.
*H04W 52/02* (2009.01)
*G08C 17/00* (2006.01)
(Continued)

(52) U.S. Cl.
CPC ........... *H04W 76/28* (2018.02); *H04L 5/0048* (2013.01); *H04W 52/0235* (2013.01); *H04W 72/042* (2013.01); *H04W 72/0446* (2013.01)

(58) Field of Classification Search
USPC .................................................. 370/311
See application file for complete search history.

(56) References Cited

U.S. PATENT DOCUMENTS

2012/0057490 A1  3/2012  Park et al.
2013/0163497 A1*  6/2013  Wei ..................... H04W 72/042
                                                        370/311
(Continued)

FOREIGN PATENT DOCUMENTS

CN      101742532 A      6/2010
CN      101778455 A      7/2010
(Continued)

OTHER PUBLICATIONS

The first Office Action of corresponding Russian application No. 2020115884, dated Oct. 30, 2020.
(Continued)

*Primary Examiner* — Maharishi V Khirodhar
(74) *Attorney, Agent, or Firm* — Ladas & Parry, LLP

(57) ABSTRACT

A method for intercepting a PDCCH and a terminal device are provided. The method includes: starting or restarting, by a terminal device, a first timer when a physical downlink control channel PDCCH is intercepted; and determining, by the terminal device, that the terminal device enters a discontinuous reception DRX turnoff OFF state or continues intercepting the PDCCH according to a position of an end time of the first timer on a first time unit; where the first time unit is a time period used by the terminal device to intercept the PDCCH, the DRX OFF state refers to a state in which the terminal device does not intercept the PDCCH. The method of the embodiment of the present disclosure effectively improves a success rate of data transmission.

16 Claims, 2 Drawing Sheets

(51) Int. Cl.
*H04W 76/28* (2018.01)
*H04L 5/00* (2006.01)
*H04W 72/04* (2009.01)

(56) References Cited

U.S. PATENT DOCUMENTS

| | | | |
|---|---|---|---|
| 2014/0146695 A1* | 5/2014 | Kim | H04L 65/80 370/252 |
| 2015/0043405 A1* | 2/2015 | Uchino | H04L 5/001 370/311 |
| 2015/0181571 A1 | 6/2015 | Park et al. | |
| 2015/0359034 A1 | 10/2015 | Kim et al. | |
| 2016/0098689 A1* | 4/2016 | Bowles | G06Q 20/208 705/23 |
| 2017/0195999 A1 | 7/2017 | Feng et al. | |
| 2018/0176806 A1* | 6/2018 | Suzuki | H04W 76/28 |
| 2018/0199313 A1* | 7/2018 | Suzuki | H04W 72/1257 |
| 2019/0098689 A1* | 3/2019 | Wei | H04W 76/28 |

FOREIGN PATENT DOCUMENTS

| | | |
|---|---|---|
| CN | 106899941 A | 6/2017 |
| KR | 20150113168 A | 10/2015 |
| RU | 2008118160 A | 11/2009 |
| WO | 2010078831 A1 | 7/2010 |
| WO | 2014119860 A1 | 8/2014 |
| WO | 2017122135 A1 | 7/2017 |
| WO | 2019095294 A1 | 5/2019 |

OTHER PUBLICATIONS

The EESR of corresponding European application No. 17932213.6, dated Mar. 6, 2020.
Ericsson: "Connected Mode DRX for NB-IoT", 3GPP Draft; R2-160471—Connected Mode DRX for NB-IoT, 3rd Generation Partnership Project (3GPP), Mobile Competence Centre; 650, Route Des Lucioles; F-06921 Sophia-Antipolis Cedex; France, vol. Ran WG2, No. Budapest, HU; Jan. 19-21, 2016, Jan. 18, 2016(Jan. 18, 2016), XP051054758.
Huawei et al:"MAC modelling of PDCCH monitoring and TTI length", 3GPP Draft; R2-1711427 MAC Modelling of PDCCH Monitoring and TTI Length, 3rd Generation Partnership Project (3GPP), Mobile Competence Centre; 650, Route Des Lucioles; F-06921 Sophia-Antipolis Cedex, vol. RAN WG2, No. Prague, Czech Republic; Oct. 9-13, 2017 Oct. 8, 2017(Oct. 8, 2017), XP051343412.
Ericsson:"C-DRX timers", 3GPP Draft; R2-1711167—C-DRX Timers, 3rd Generation Partnership Project (3GPP), Mobile Competence Centre; 650, Route Des Lucioles; F-06921 Sophia-Antipolis Cedex; France, vol. RAN WG2, No. Prague, Czech Republic; Oct. 9-13, 2017 Oct. 8, 2017(Oct. 8, 2017), XP051343175.
Interdigital Inc:"Timing Aspects in MAC", 3GPP Draft; R2-1708723(R15 NR WI AI I0312 MAC Timers), 3rd Generation Partnership Project (3GPP), Mobile Competence Centre; 650, Route Des Lucioles; F-06921 Sophia-Antipolis Cedex; France, vol. RAN WG2, No. Berlin, Germany; Aug. 21-25, 2017 Aug. 20, 2017(Aug. 20, 2017), XP051318528.
OPPO:"DRX operation for cross slot PDCCH monitoring", 3GPP Draft; R2-1712201—DRX Operation for Cross Slot PDCCH Monitoring, 3rd Generation Partnership Project (3GPP), Mobile Competence Centre; 650, Route Des Lucioles; F-06921 Sophia-Antipolis Cedex; vol. RAN WG2, No. Reno, USA; Dec. 27, 2017-Dec. 1, 2017 Nov. 17, 2017(Nov. 17, 2017), XP051371352.
ZTE, 3GPP TSG-RAN WG2 Meeting#/99bis, R2-1710321; consideration on DRX, Prague, Czech Republic, Oct. 9-13, 2017.
3GPP. 'Medium Access Control (MAC) protocol specification' 3GPP TS 36.321 V14.0.0 (Sep. 30, 2016).
International Search Report in the international application No. PCT/CN2017/111686, dated Jul. 27, 2018.
Written Opinion of the International Search Authority in the international application No. PCT/CN2017/111686, dated Jul. 27, 2018 and English translation provided by Google Translate.
The first Office Action of corresponding Korean application No. 10-2020-7010623, dated Apr. 19, 2021.
The first Office Action of corresponding Indian application No. 202017016191, dated Jul. 15, 2021.
The first Office Action of corresponding Japanese application No. 2020-521962, dated Sep. 14, 2021.
Ericsson, PDCCH, CORESET and event-driven MAC[online], 3GPP TSG-RAN WG2 #99 Tdoc R2-1708187, Internet<URL:http://www.3gpp.org/ftp/tsg_ran/WG2_RL2/TSGR2_99/Docs/R2-1708187.zip>, Aug. 11, 2017, entire document.
InterDigital Inc., Timing Aspects in MAC[online], 3GPP TSG-RAN WG2 #99bis R2-1710655, Internet<URL:http//www.3gpp.org/ftp/tsg_ran/WG2_RL2/TSGR2_99bis/Docs/R2-1710655.zip>, Sep. 27. 2017, entire document.

\* cited by examiner

METHOD FOR INTERCEPTING PDCCH AND TERMINAL DEVICE

CROSS-REFERENCE TO RELATED APPLICATION

This application is a continuation of International Application No. PCT/CN2017/111686, filed on Nov. 17, 2017, the disclosure of which is hereby incorporated by reference in its entirety.

TECHNICAL FIELD

Embodiments of the present disclosure relate to the field of communication, and more specifically, to a method for intercepting a PDCCH and a terminal device.

BACKGROUND

In the prior art, packet based data streams are usually bursty. In other words, a terminal device has data transmission for a period of time, but does not have data transmission for a longer period of time later. Therefore, if the terminal device always blindly detects a Physical Downlink Control Channel (PDCCH), it will result in excessive large power consumption of the terminal device.

In order to solve the above problem, in a Long Term Evolution (LTE), a concept of Discontinuous Reception (DRX) is proposed. Specifically, when the terminal device does not have data transmission, the power consumption can be reduced by stopping receiving the Physical Downlink Control Channel (PDCCH) (at which time blind detection of the PDCCH is stopped), thereby improving battery life.

More specifically, a network device configures a DRX cycle for the terminal device in a Radio Resource Control_CONNECTED (RRC_CONNECTED) state.

The DRX cycle is composed of an On Duration and an Opportunity for DRX. During the On Duration, the terminal device monitors and receives the PDCCH, and during the Opportunity for DRX, the terminal device does not receive the PDCCH to reduce the power consumption.

However, in a New Radio (NR), the PDCCH can support different cycles and On Durations. At the same time, a position of a DRX inactivity timer (drx-InactivityTimer) is also flexible. If a time at which the drx-InactivityTimer fails is in the middle of a certain PDCCH monitoring occasion, a monitoring of the PDCCH will be suspended due to a failure of the drx-InactivityTimer, which affects a reception of subsequent data, thereby reducing a success rate of data transmission.

SUMMARY

A method for intercepting a PDCCH and a terminal device are provided, which can effectively improve a success rate of data transmission.

In a first aspect, a method for intercepting a PDCCH is provided, including:

starting or restarting, by a terminal device, a first timer when a physical downlink control channel PDCCH is intercepted; and determining, by the terminal device, that the terminal device enters a discontinuous reception DRX turn-off OFF state or continues intercepting the PDCCH according to a position of an end time of the first timer on a first time unit; where the first time unit is a time period used by the terminal device to intercept the PDCCH, the DRX OFF state refers to a state in which the terminal device does not intercept the PDCCH.

The method of the embodiment of the present disclosure enables that during a time period following the end time of the first timer, even if the terminal device continues being scheduled, the terminal device continues being in an On Duration, that is, it continues monitoring the PDCCH during the configured On Duration, which effectively improves a success rate of data transmission.

In some possible implementations, the determining, by the terminal device, that the terminal device enters a discontinuous reception DRX turnoff OFF state or continues intercepting the PDCCH according to a position of an end time of the first timer on a first time unit, includes:

continuing, by the terminal device, intercepting the PDCCH when the end time of the first timer is within the first time unit.

In some possible implementations, the method further includes:

entering, by the terminal device, the DRX OFF state when the PDCCH is not intercepted from the end time of the first timer to an end time of the first time unit.

In some possible implementations, the method further includes:

restarting, by the terminal device, the first timer when the PDCCH is intercepted from the end time of the first timer to an end time of the first time unit.

In some possible implementations, a length of the first time unit is configured by a network device.

In some possible implementations, the first time unit includes at least one orthogonal frequency division multiplexing OFDM symbol.

In some possible implementations, a length of the first time unit is a time length of a control resource set of the terminal device.

In some possible implementations, a unit of the first time unit is millisecond, or the unit is the number of OFDM symbols.

In some possible implementations, a starting position of the first time unit is configured by a network device.

In some possible implementations, a starting position of the first time unit is a position of any symbol in a slot, and the slot includes 7 or 14 orthogonal frequency division multiplexing OFDM symbols.

In a second aspect, a terminal device is provided, including:

a starting unit, configured to start or restart a first timer when a physical downlink control channel PDCCH is intercepted; and a processing unit, configured to determine that the terminal device enters a discontinuous reception DRX turnoff OFF state or continues intercepting the PDCCH according to a position of an end time of the first timer on a first time unit; where the first time unit is a time period used by the terminal device to intercept the PDCCH, the DRX OFF state refers to a state in which the terminal device does not intercept the PDCCH.

In a third aspect, a terminal device is provided, including: a processor, the processor is configured to:

start or restart a first timer when a physical downlink control channel PDCCH is intercepted; and determine that the terminal device enters a discontinuous reception DRX turnoff OFF state or continues intercepting the PDCCH according to a position of an end time of the first timer on a first time unit; where the first time unit is a time period used by the terminal device to intercept the PDCCH, the DRX OFF state refers to a state in which the terminal device does not intercept the PDCCH.

In a fourth aspect, a computer readable medium is provided for storing a computer program, the computer program includes instructions for performing the method embodiment of the first aspect described above.

In a fifth aspect, a computer chip is provided, including: an input interface, an output interface, at least one processor, and a memory, where the processor is configured to execute codes in the memory, when the codes are executed, the processor can implement respective processes performed by a terminal device in the method for intercepting a PDCCH in the first aspect described above.

In a sixth aspect, a communication system is provided, including the foregoing terminal device and network device.

DESCRIPTION OF EMBODIMENTS

Figure 1:
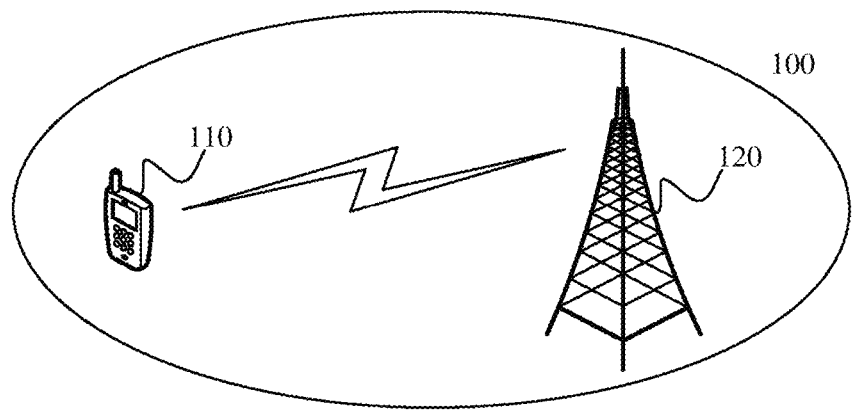
FIG. 1 is an example of an application scenario of the present disclosure.

FIG. 1 is a schematic diagram of an application scenario according to an embodiment of the present disclosure.

As shown in FIG. 1, a communication system 100 may include a terminal device 110 and a network device 120. The network device 120 may communicate with the terminal device 110 through an air interface. Multi-service transmission is supported between the terminal device 110 and the network device 120.

However, packet based data streams are usually bursty. In other words, the terminal device 100 has data transmission for a period of time, but does not have data transmission for a longer period of time later. Therefore, if the terminal device 100 always blindly detects a physical downlink control channel (PDCCH), it will result in excessive large power consumption of the terminal device.

Although, in a Long Term Evolution (LTE), a concept of Discontinuous Reception (DRX) is proposed. Specifically, the main idea of the DRX is that: a network can configure a terminal to wake up at a time foreseen by the network (DRX ON), that is, a radio frequency RF is turned on, and the terminal monitors a downlink control channel; at the same time, the network can also configure the terminal to sleep at a time foreseen by the network (DRX OFF), that is, the radio frequency RF is turned off, and the terminal does not monitor the downlink control channel. In this way, if there is data to be transmitted to the terminal, the network can schedule the terminal within the DRX ON time of the terminal, and during the DRC OFF time, the power consumption of the terminal can be reduced due to that the radio frequency is turned off.

However, due to in a New Radio (NR), the PDCCH can support different cycles and On Durations. At the same time, a position of a DRX inactivity timer (drx-InactivityTimer) is also flexible.

It can be found that if a time at which the drx-InactivityTimer fails is in the middle of a certain PDCCH monitoring occasion, a monitoring of the PDCCH will be suspended due to a failure of the drx-InactivityTimer, which affects a reception of subsequent data, thereby reducing a success rate of data transmission.

For example, in the existing PDCCH monitoring, it is possible that the On Duration of the PDCCH spans two adjacent slots, which causes the drx-InactiveTimer to fail to operate correctly.

Therefore, in the embodiment of the present disclosure, a method for intercepting a PDCCH is provided. By analyzing a positional relationship between the drx-inactivityTimer and the monitoring occasion, a process of the terminal device intercepting the PDCCH is improved, which can effectively improve the success rate of data transmission.

It should be understood that the embodiment of the present disclosure is only exemplarily illustrating by the communication system 100, but the embodiment of the present disclosure is not limited thereto. That is, the technical solution of the embodiment of the present disclosure can be applied to various communication systems, for example, a Global System of Mobile communication (GSM) system, a Code Division Multiple Access (CDMA) system, and a Wideband Code Division Multiple Access (WCDMA) system, a General Packet Radio Service (GPRS), a Long Term Evolution (LTE) system, a LTE Time Division Duplex (TDD) system, a Universal Mobile Telecommunication System (UMTS), or the like.

Moreover, the present disclosure describes various embodiments in combination with the network device and the terminal device.

The network device 120 may refer to any entity on a network side that is used to transmit or receive signals. For example, it may be a user equipment of a Machine Type Communication (MTC), a Base Transceiver Station (BTS) in the GSM or CDMA, a base station (NodeB) in the WCDMA, an Evolutional Node B (eNB or eNodeB) in the LTE, a base station device in a 5G network, or the like.

The terminal device 110 can be any terminal device. Specifically, the terminal device 110 can communicate with one or more Core Network via a Radio Access Network (RAN), and can also be referred to as an access terminal, a user equipment (UE), a subscriber unit, a subscriber station, a mobile station, a mobile table, a remote station, a remote terminal, a mobile device, a user terminal, a terminal, a wireless communication device, a user agent or a user apparatus. For example, it can be a cellular phone, a cordless phone, a Session Initiation Protocol (SIP) phone, a Wireless Local Loop (WLL) station, a Personal Digital Assistant (PDA), and a handheld device with wireless communication function, a computing device or other processing devices connected to a wireless modem, an in-vehicle device, a wearable device, and a terminal device in the 5G network, or the like.

Figure 2:
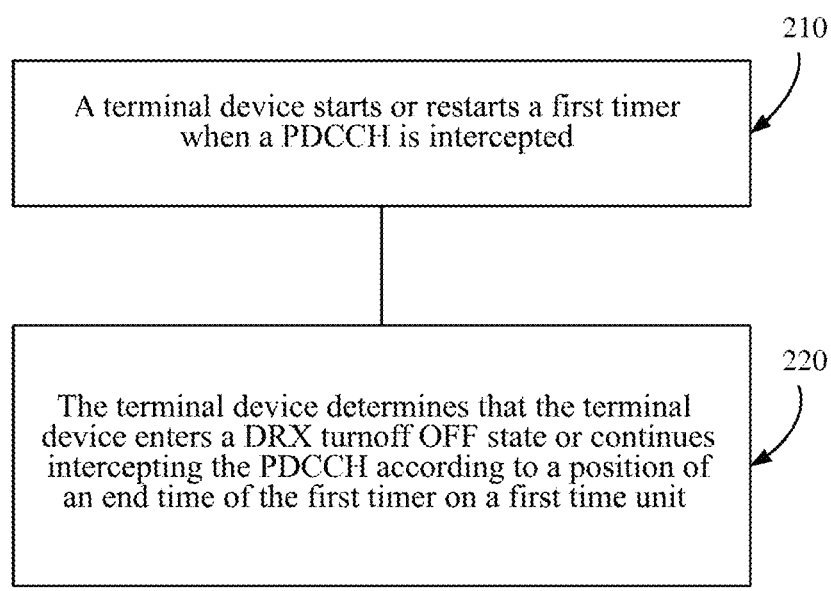
FIG. 2 is a schematic flowchart of a method for intercepting a PDCCH according to an embodiment of the present disclosure.

FIG. 2 is a schematic flowchart of a method for intercepting a PDCCH according to an embodiment of the present disclosure.

Specifically, as described in FIG. 2, the method includes:

210. A terminal device starts or restarts a first timer when a PDCCH is intercepted.

220. The terminal device determines that the terminal device enters a DRX turnoff OFF state or continues intercepting the PDCCH according to a position of an end time of the first timer on a first time unit.

Specifically, in most cases, in a certain subframe, after the terminal device is scheduled to receive or transmit data, it is likely to continue being scheduled in next few subframes, if it is to wait to receive or transmit these data until next DRX cycle, it will introduce an additional delay. In order to reduce this type of delay, the UE continues being in an On Duration after being scheduled, that is, it continues monitoring the physical downlink control channel (PDCCH) during the configured On Duration.

It should be understood that in the embodiment of the present disclosure, the first time unit is a time period used by the terminal device to intercept the PDCCH, and the DRX OFF state refers to a state in which the terminal device does not intercept the PDCCH.

It should be noted that in the embodiment of the present disclosure, the DRX OFF state refers to a state in which the terminal device is in an Opportunity for DRX.

More specifically, a Media Access Control (MAC) entity is configured with a DRX function by a Radio Resource Control (RRC) for controlling a behavior of the terminal monitoring the PDCCH.

Figure 3:
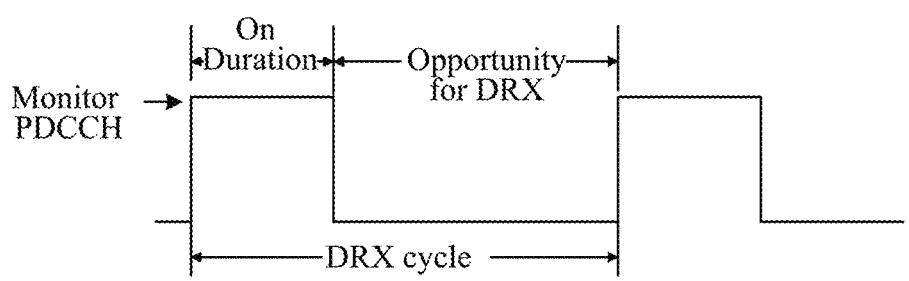
FIG. 3 is a schematic diagram of a DRX according to an embodiment of the present disclosure.

For example, as described in FIG. 3, the DRX cycle configured by a network device for the terminal device is composed of an On Duration and an Opportunity for DRX. In a RRC CONNECTED state (RRC CONNECTED) mode, if the terminal is configured with the DRX function, during the On Duration time, the terminal device monitors and receives the PDCCH; during the Opportunity for DRX time, the terminal device does not receive the PDCCH to reduce the power consumption.

In an embodiment of the present disclosure, the terminal device in the Opportunity for DRX merely does not receive the PDCCH, but can receive data from other physical channels. The embodiment of the present disclosure does not specifically limit that, for example, the terminal device can receive a Physical Downlink Shared Channel (PDSCH), an acknowledgment/non-acknowledgement (ACK/NACK), or the like. For another example, in a Semi-Persistent Scheduling (SPS), the terminal device can receive periodically configured PDSCH data.

In an embodiment of the present disclosure, an implementation mechanism is that: the first timer is an InactivityTimer (drx-InactivityTimer).

Specifically, when the terminal device is scheduled to initially transmit data, a drx-InactivityTimer is started (or restarted), and a UE will remain in an active state until that the drx-InactivityTimer times out. The drx-InactivityTimer specifies a "continuous PDCCH subframe number" at which the UE continues being in the active state after the UE successfully decodes a PDCCH indicating an initially transmitted UL or DL user data.

For example, when the UE receives a scheduling message (indicating the initially transmitted PDCCH) during the On Duration, the UE will start a "drx-InactivityTimer" and monitors the PDCCH in each down subframe during operation of the drx-InactivityTimer.

For another example, the UE, when receiving a scheduling information (indicating the initially transmitted PDCCH) during operation of a "drx-InactivityTimer", will restart the drx-InactivityTimer.

That is, when the UE has an initial transmission data to be scheduled, the timer is started or restarted once.

It is noted that: (1) an initial transmission, rather than a retransmission herein, is referred to here, that is, the PDCCH indicating retransmission will not restart the drx-InactivityTimer; (2) although the Physical Downlink Shared Channel (PDSCH) transmitted in the periodic SPS subframe is an initial transmission, it is not accompanied by transmitting the PDCCH, so that the PDSCH will not restart the drx-InactivityTimer; (3) the drx-InactivityTimer specifies a consecutive "PDCCH subframe number (down subframe)" rather than consecutive "subframe number".

It should be understood that, in the embodiment of the present disclosure, the first timer being the drx-inactivityTimer is merely an exemplary description, and the embodiment of the present disclosure is not limited thereto. For example, the first timer may also be a retransmission timer (drx-RetransmissionTimer), or the like.

The following describes an implementation in which the terminal device intercepts the PDCCH according to a position of an end time of the first timer on the first time unit in the embodiment of the present disclosure.

In an embodiment, when the end time of the first timer is within the first time unit, the terminal device continues intercepting the PDCCH.

It should be understood that the end time of the first timer in the embodiment of the present disclosure may be a time at which the first timer times out. Therefore, even if the terminal device continues being scheduled in next few subframes following the end time of the first timer, the UE continues being in the On Duration, that is, it continues monitoring the PDCCH during the configured On Duration, which effectively improves the success rate of data transmission.

Further, the terminal device may perform a subsequent operation according to a monitoring result from the end time of the first timer to an end time of the first time unit.

For example, when the PDCCH is not intercepted from the end time of the first timer to the end time of the first time unit, the terminal device may enter the DRX OFF state.

For another example, when the PDCCH is intercepted from the end time of the first timer to the end time of the first time unit, the terminal device may restart the first timer.

In other words, if the end time of the first timer is in the middle of the first time unit, the terminal needs to continue intercepting the PDCCH until the last symbol of the first time unit. If the PDCCH is still not intercepted at the last symbol, the terminal enters the DRX off state. If the PDCCH is intercepted before the last symbol (including the last symbol), the terminal restarts the first timer. Therefore, even if the terminal device continues being scheduled in next few subframes following the end time of the first timer, the UE continues being in the On Duration, that is, it continues monitoring the PDCCH during the configured On Duration, which effectively improves the success rate of data transmission.

In an implementation, a length of the first time unit is configured by a network device.

In an implementation, the first time unit includes at least one orthogonal frequency division multiplexing (OFDM) symbol. For example, a size of the first time unit may be 1 to 3 OFDM symbols.

It should be understood that, in the embodiment of the present disclosure, a length of each OFDM symbol in the at least one OFDM symbol is not specifically limited. For example, the length of the each OFDM symbol may correspond to a subcarrier spacing of the terminal device.

In the embodiment of the present disclosure, the length of the first time unit is a time length of a control resource set (CORESET) of the terminal device. In other words, the length of the first time unit is a configuration duration of the control resource set (CORESET). More specifically, the CORESET may be a time period during which the terminal device intercepts a potential PDCCH, that is, there may be a PDCCH, and there may be no PDCCH.

As an example rather than a limitation, a unit of the first time unit is millisecond (ms), or the unit is the number of OFDM symbols. For example, the size of the first time unit is 1 ms. For another example, the size of the first time unit is 4 OFDM symbols or the like.

In an implementation, a starting position of the first time unit is configured by a network device.

In an implementation, a starting position of the first time unit is a position of any symbol in a slot, and the slot includes 7 or 14 OFDM symbols.

It should be understood that, in the embodiment of the present disclosure, the slot including 7 or 14 OFDM symbols is only exemplary description, and is not specifically limited in the embodiment of the present disclosure. For example, the slot may also include 21 OFDM symbols, or the like.

Figure 4:
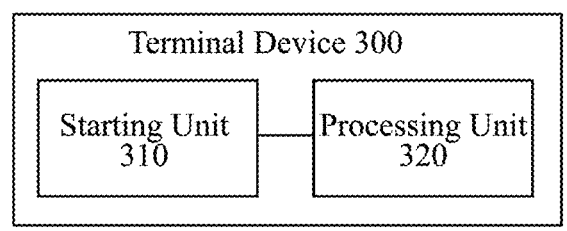
FIG. 4 is a schematic block diagram of a terminal device according to an embodiment of the present disclosure.

FIG. 4 is a schematic block diagram of a terminal device according to an embodiment of the present disclosure.

Specifically, as shown in FIG. 4, a terminal device 300 includes:

a starting unit 310, configured to start or restart a first timer when a physical downlink control channel PDCCH is intercepted; and a processing unit 320, configured to determine that the terminal device enters a Discontinuous Reception DRX turnoff OFF state or continues intercepting the PDCCH according to a position of an end time of the first timer on a first time unit; where the first time unit is a time period used by the terminal device to intercept the PDCCH, the DRX OFF state refers to a state in which the terminal device does not intercept the PDCCH.

In an implementation, the processing unit 320 is further configured to:

continue intercepting the PDCCH when the end time of the first timer is within the first time unit.

In an implementation, the processing unit 320 is further configured to:

enter the DRX OFF state when the PDCCH is not intercepted from the end time of the first timer to an end time of the first time unit.

In an implementation, the foregoing starting unit 310 is further configured to:

restart the first timer when the PDCCH is intercepted from the end time of the first timer to an end time of the first time unit.

In an implementation, a length of the first time unit is configured by a network device.

In an implementation, the first time unit includes at least one orthogonal frequency division multiplexing OFDM symbol.

In an implementation, a length of the first time unit is a time length of a control resource set of the terminal device.

In an implementation, a unit of the first time unit is millisecond, or the unit is the number of OFDM symbols.

In an implementation, a starting position of the first time unit is configured by a network device.

In an implementation, a starting position of the first time unit is a position of any symbol in a slot, and the slot includes 7 or 14 orthogonal frequency division multiplexing OFDM symbols.

Figure 5:
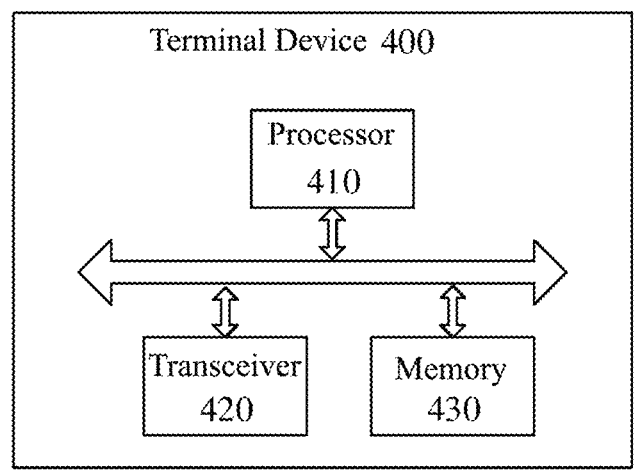
FIG. 5 is a schematic block diagram of another terminal device according to an embodiment of the present disclosure.

It should be noted that the foregoing starting unit 310 and processing unit 320 may be implemented by a processor. As shown in FIG. 5, a terminal device 400 may include a processor 410, a transceiver 420, and a memory 430. The memory 430 can be configured to store information, and can also be configured to store codes, instructions, or the like, that are executed by the processor 410. Various components in the terminal device 400 are connected by a bus system, where the bus system includes a power bus, a control bus, and a status signal bus in addition to a data bus.

The terminal device 400 shown in FIG. 5 can implement various processes implemented by the terminal device in the foregoing method embodiment of FIG. 2. To avoid repetition, details are not described herein again.

It should be understood that the method embodiment in the embodiments of the present disclosure may be applied to the processor or implemented by the processor.

In an implementation process, each step of the method embodiments in the embodiments of the present disclosure may be accomplished by an integrated logic circuit of hardware in a processor or instructions in a form of software. More specifically, the steps in combination with the method disclosed in the embodiments of the present disclosure may be directly embodied as performed by a hardware decoding processor, or may be performed by a combination of hardware and software modules in the decoding processor. The software module can be located in a mature storage medium in the art such as a random access memory, a flash memory, a read only memory, a programmable read only memory or an electrically erasable programmable memory, a register, or the like. The storage medium is located in the memory, and the processor reads information in the memory and combines its hardware to accomplish the steps of the above method.

The processor may be an integrated circuit chip with signal processing capability, and can implement or perform the methods, steps, and logic blocks disclosed in the embodiments of the present disclosure. For example, the above processor may be a general purpose processor, a digital signal processor (DSP), an application specific integrated circuit (ASIC), a field programmable gate array (FPGA), or other programmable logic devices, transistor logic devices, discrete hardware components, or the like. Further, the general purpose processor may be a microprocessor or the processor may be any conventional processor or the like.

Moreover, in the embodiments of the present disclosure, the memory may be a volatile memory or a non-volatile memory, or may include both volatile and non-volatile memories. The non-volatile memory may be a read-only memory (ROM), a programmable ROM (PROM), an erasable PROM (EPROM), or an electrically EPROM (EEPROM) or a flash memory. The volatile memory may be a random access memory (RAM) that acts as an external cache. It should be understood that the above memory is illustrative and not intend to limit thereto. For example, the memory in the embodiments of the present disclosure may also be a static RAM (SRAM), a dynamic RAM (DRAM), or a synchronous DRAM (SDRAM), a double data rate SDRAM (DDR SDRAM), an enhanced SDRAM (ESDRAM), a synchro link DRAM (SLDRAM) or a Direct Rambus RAM (DR RAM), or the like. That is, the memory of the systems and methods described herein is intended to include, rather than limit these and any other suitable type of memory.

In the end, it should be noted that the terms used in the embodiments of the present disclosure and the appended claims are for a purpose of describing particular embodiments and are not intended to limit the embodiments of the present disclosure.

For example, "a", "said", and "the" of singular form used in the embodiments of the present disclosure and the appended claims are also intended to include that of plural form unless the context clearly indicates other meanings.

Also for example, depending on the context, the words "when . . . " as used herein may be interpreted as "if" or "as if" or "at the time" or "in response to determining" or "in response to detecting". Similarly, depending on the context, the phrase "if it is determined" or "if it is detected (a stated condition or event)" may be interpreted as "when it is determined" or "in response to determining" or "when it is detected (a stated condition or event)" or "in response to detecting (a stated condition or event)".

Those of ordinary skill in the art will appreciate that the units and algorithm steps of the various examples described in combination with the embodiments disclosed herein can be implemented in a form of electronic hardware or a combination of computer software and electronic hardware. Whether these functions are performed in the form of hardware or software depends on the specific application and design constraints of the technical solution. A professional technical person can use different methods to implement the described functions for each particular application, but such implementation should not be considered to be beyond the scope of the embodiments of the present disclosure.

A person skilled in the art can clearly understand that for the convenience and brevity of the description, the specific operation process of the systems, apparatuses and units described above can be referred to the corresponding processes in the foregoing method embodiments, and details are not described herein again.

In the several embodiments provided in present application, it should be understood that the disclosed systems, apparatuses, and methods may be implemented in other ways. For example, the apparatus embodiments described above are only illustrative. For example, the division of the unit is only a logical function division. In an actual implementation, there may be another division manner. For example, a plurality of units or components may be combined or can be integrated into another system, or some features can be ignored or not executed. In addition, the mutual coupling or direct coupling or communication connection shown or discussed may be an indirect coupling or communication connection through some interfaces, apparatuses or units, and may be in an electrical, mechanical, or in other forms.

The units described as separate components may or may not be physically separated, and the components displayed as units may or may not be physical units, that is, may be located in one place, or may be distributed onto multiple network units. Some or all of the units may be selected according to actual needs to achieve the objectives of the embodiments of the present disclosure.

In addition, each functional unit in the embodiments of the present disclosure may be integrated into one processing unit, or each unit may exist separately physically, or two or more units may be integrated into one unit.

If implemented in the form of a software functional unit and sold or used as a standalone product, it can be stored in a computer readable storage medium. Based on such understanding, the technical solutions of the embodiments of the present disclosure, essentially or the part contributing to the prior art or the part of the technical solutions, may be embodied in the form of a software product, where the computer software product is stored in a storage medium, and includes a number of instructions for causing a computer device (which may be a personal computer, a server, or a network device, or the like) to perform all or part of the steps of the method of the embodiments of the present disclosure. The foregoing storage medium includes various media that can store program codes, such as a USB flash disk, a mobile hard disk, a read only memory, a random access memory, a magnetic disk, or an optical disk.

The above content are only specific embodiments of the present disclosure, but the protection scope of the embodiments of the present disclosure is not limited thereto, and any person skilled in the art can easily think of variations or substitutions in the technical scope disclosed in the embodiments of the present disclosure, which should be included within the protection scope of the embodiments of the present disclosure. Therefore, the protection scope of the embodiments of the present disclosure should be subject to the protection scope of the claims.

What is claimed is:

1. A method for intercepting a physical downlink control channel (PDCCH), comprising:
    starting or restarting, by a terminal device, a first timer when a PDCCH is intercepted; and
    determining that the terminal device enters a discontinuous reception (DRX) turnoff (OFF) state in a condition that an end time of the first timer is in the middle of a first time unit; wherein the first time unit is a PDCCH monitoring occasion used by the terminal device to intercept the PDCCH, the DRX OFF state refers to a state in which the terminal device does not intercept the PDCCH in the PDCCH monitoring occasion used to intercept the PDCCH.

2. The method according to claim 1, further comprising:
    entering, by the terminal device, the DRX OFF state when the PDCCH is not intercepted from the end time of the first timer to an end time of the first time unit.

3. The method according to claim 1, wherein a length of the first time unit is configured by a network device.

4. The method according to claim 1, wherein the first time unit comprises at least one orthogonal frequency division multiplexing (OFDM) symbol.

5. The method according to claim 1, wherein a length of the first time unit is a time length of a control resource set of the terminal device.

6. The method according to claim 1, wherein a unit of the first time unit is millisecond, or the unit is the number of OFDM symbols.

7. The method according to claim 1, wherein a starting position of the first time unit is configured by a network device.

8. The method according to claim 1, wherein a starting position of the first time unit is a position of any symbol in a slot, and the slot comprises 7 or 14 orthogonal frequency division multiplexing (OFDM) symbols.

9. A terminal device, comprising: a memory, a processor, and a computer program stored on the memory and operable on the processor,
    wherein the processor, when running the computer program, is configured to:
    start or restart a first timer when a physical downlink control channel (PDCCH) is intercepted; and
    determine that the terminal device enters a discontinuous reception (DRX) turnoff (OFF) state in a condition that an end time of the first timer is in the middle of a first time unit; wherein the first time unit is a PDCCH monitoring occasion used by the terminal device to intercept the PDCCH, the DRX OFF state refers to a state in which the terminal device does not intercept the PDCCH in the PDCCH monitoring occasion used to intercept the PDCCH.

10. The terminal device according to claim 9, wherein the processor is further configured to:
   enter the DRX OFF state when the PDCCH is not intercepted from the end time of the first timer to an end time of the first time unit.

11. The terminal device according to claim 9, wherein a length of the first time unit is configured by a network device.

12. The terminal device according to claim 9, wherein the first time unit comprises at least one orthogonal frequency division multiplexing (OFDM) symbol.

13. The terminal device according to claim 9, wherein a length of the first time unit is a time length of a control resource set of the terminal device.

14. The terminal device according to claim 9, wherein a unit of the first time unit is millisecond, or the unit is the number of OFDM symbols.

15. The terminal device according to claim 9, wherein a starting position of the first time unit is configured by a network device.

16. The terminal device according to claim 9, wherein a starting position of the first time unit is a position of any symbol in a slot, and the slot comprises 7 or 14 orthogonal frequency division multiplexing (OFDM) symbols.

* * * * *